United States Patent Office 2,857,404
Patented Oct. 21, 1958

2,857,404

STEROID ESTERS AND METHOD OF MAKING SAME

Virgil W. Gash, Dayton, Ohio, assignor to Monsanto Chemical Company, St. Louis, Mo., a corporation of Delaware No Drawing. Application November 18, 1955
Serial No. 547,847

12 Claims. (Cl. 260—397.4)

This invention is directed to new steroid compounds, and to a method of preparing such compounds.

The new steroid compounds of my invention are acylsalicyloxy substituted steroids, specifically, the acylsalicyloxy substituted cyclopentano-10,13-dimethylpolyhydrophenanthrenes of the pregnane-20-one series. Such compounds combine the therapeutic properties of the steroids with those of the acyl salicylates.

The acylsalicyloxy substituted streoids of my invention can be represented by the general structure:

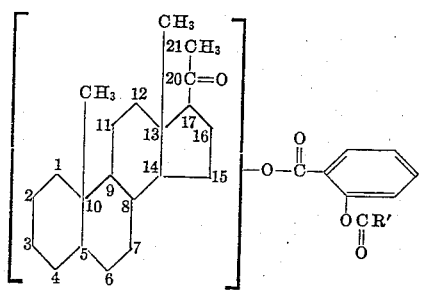

in which the mono-valent radical in the brackets is a cyclopentano-10,13-dimethylpolyhydrophenanthrene radical of the pregnane-20-one series. The pregnane-20-one series is considered to include both saturated and unsaturated cycloaliphatic steroids of the above structure, provided that there is no aromatic unsaturation. The pregnane-20-one series include streoids that are hydrocarbon except for the 20-keto group, as well as compounds containing substituents such as hydroxyl, oxo and halogen groups; for example, the steroids can have a 3- or 11-keto group, a 3, 11, 17 or 21 hydroxyl group, or a 9-α-fluro- or 9-α-chloro-group. The steroids of the pregnane-20-one series can contain various ester or alkoxy substituents in place of the hydroxyl groups; of course, in my new compounds there is at least one acylsalicyloxy group substituted on the steroid. There can be one or two double bonds in the phenanthrene rings. The hydroxyl group of the salicyloxy radical is substituted by an acyl group (R'CO in the above formula), such as an aliphatic acyl group of 2 to 8 carbon atoms (R' representing an alkyl group), the acetyl group being preferred.

My preferred compounds are the o-acylsalicylic acid esters of those steroids of the structure:

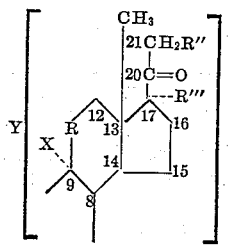

in which Y is selected from the group consisting of

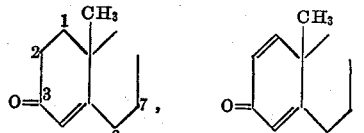

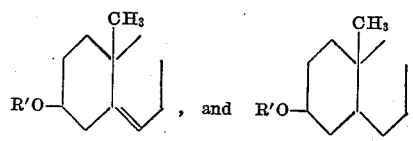

in which R is selected from the groups consisting of —CH$_2$—,

—CHOH—, and —CHOR'''', and in which R'''' is selected from the group consisting of acyl and alkyl groups; in which R' is selected from the groups consisting of hydrogen, alkyl and acyl groups; in which R'' is selected from the group consisting of —H, —OH, —OR$_1$, and in which R$_1$ is selected from the group consisting of acyl and alkyl groups; in which R''' is selected from the group consisting of —H, —OH, acyloxy, and alkoxy; and in which X is selected from the group consisting of —Cl, —F, or —H; and in which at least one of R' and R$_1$ is hydrogen, thereby permitting the acylsalicylic acid ester linkage to be formed, such an acylsalicylic acid ester group being attached to at least one of the 3- and 21-positions of the steroid. Some examples of the new compounds of my invention are Δ$^5$-pregnene-3,21-diol-11,20-dione 21-(O-acetylsalicylate), Δ$^4$-pregnene-17α,21-diol-3,11,20-trione 17-acetate,21-(O-acetylsalicylate), pregnane-3,17α-diol-20-one 3-(O-acetylsalicylate), pregnane-3,17α-diol-11,20-dione 3-(O-acetylsalicylate), Δ$^5$-pregnene-3,17α,21-triol-11,20-dione 3,21-di-(O-acetylsalicylate), pregnane-3,11-diol-20-one 3-(O-pentanoylsalicylate), Δ$^5$-pregnene-3-ol-20-one 3-(O-acetylsalicylate), Δ$^{1,4}$-pregnadiene-11,17,21-triol-3,20-dione 21-(O-acetylsalicylate), Δ$^{1,4}$-pregnadiene-17,21-diol-3,11,20-trione 21-(O-acetylsalicylate), Δ$^{1,4}$-pregnadiene-17,21-diol-3,20-dione 21-(O-acetylsalicylate), Δ$^{1,4}$-pregnadiene-21-ol-3,20-dione 21-(O-acetylsalicylate), cortisone 21-(O-propionylsalicylate), cortisone 21-(O-butyrylsalicylate), cortisone 21-(O-caproylsalicylate), and cortisone 21-(O-octanoylsalicylate). Especially valuable compounds are the O-acetylsalicylates of the corticosterones, i. e., those compounds conforming to the structure:

in which R is selected from —CH$_2$, —CO, and —CHOH, R' is —H or —OH, and X is —Cl, —F, or —H; examples of these particular compounds are corticosterone 21-(O-acetylsalicylate), 17-hydroxycorticosterone 21-(O-acetylsalicylate), 11-desoxycorticosterone 21-(O-acetylsalicylate), 17-hydroxydehydrocorticosterone 21-(O-acetylsalicylate), 9α-fluoro-17-hydroxycorticosterone 21-(O-acetylsalicylate), and 9α-chloro-17-hydroxycorticosterone 21-(O-acetylsalicylate). As can be seen from the structure above, the corticosterones are members of the pregnane series characterized by 3-keto, 4-ene, 20-one and 21-hydroxyl groups.

The new compounds of my invention have valuable therapeutic and analgesic properties. Both the acetylsalicylates and certain steroids, e. g., cortisone, are known to have therapeutic activity toward rheumatoid arthritis. It has now been discovered that cortisone 21-O-acetylsalicylate has greatly enhanced activity compared to cortisone in reducing edema and swelling in artificially inflamed mammalian joints. This greatly increased activity shows that the combination of the two reactive groups in one compound produces a synergistic effect, rather than a mere additive effect of the two compounds. Moreover, the presence of the O-acetyl-salicyloxy group, even in comparatively inactive steroid compounds, such as pregnenolone, makes the compounds considerably more active, as shown by the anti-inflammatory action of pregnenolone 3-(O-acetylsalicylate) in tests with rats. The cause for the increased activity of these compounds is not clear; perhaps the steroid aids in transporting the O-acetylsalicylate to the proper location for therapeutic action; or perhaps esterification with the O-acetylsalicylic acid somehow activates the steroid compound itself, or aids in transporting the steroid. However, regardless of the mechanism, it is clear that esterification of inactive steroids of the pregnane-20-one series with an O-acylsalicyclic acid produces active compounds, and such esterification of active steroids of the pregnane-20-one series produces more active compounds.

While some of the members of my new class of chemical compounds may exist in more than one sterioisomeric form, and it may be recognized that some isomers have greater cortisone-like activity than others, all of the isomeric forms of my new class of compounds are novel and within the scope of the present invention.

My method for producing my new compounds involves the esterification of a cyclopentano-10,13-dimethylpolyhydrophenanthrene of the pregnane-20-one series containing at least one esterifiable hydroxyl group by treating the said phenanthrene with an O-acylsalicyloyl halide or an O-acylsalicylic acid anhydride. The acyl group blocks the hydroxyl group of the salicyloxyl halide so that it cannot take part in the reaction; any acyl group will work, although the acetyl group is preferred. As esterifying reactant the acylsalicyloyl chlorides are preferred, although the bromides can also be used. It is also possible to use an O-acylsalicylic anhydride although these anhydrides are not as readily available as the acid halides. The reaction conditions can be varied considerably, but temperatures in the range of 0° C. to room temperature or 25° C. are ordinarily used; with some steroids low temperatures are preferably in order to avoid degradation. The reaction is conducted in an organic solvent, such as pyridine, pyridine and ether, ether, benzene, chloroform, etc. The time of the reaction can vary greatly, e. g., from a few minutes to two days. A basic material is usually included in the reaction mixture to neutralize the acid which is liberated in the reaction. Such a basic substance, e. g., pyridine, is desirable when esterifying some steroids, e. g., cortisone, in order to obtain good yield, as in the absence of such a base the liberated acid would tend to degrade the steroid side chain. With other steroids, e. g. pregnenolone, the reaction can be conducted with no base, or with sodium bicarbonate or a stronger base, although an organic amine such as pyridine is still preferred. The proportions can be varied from a slight excess of esterifying agent over the stoichiometric amount required to esterify the desired number of hydroxyl groups, up to a much larger excess, e. g., 100 percent.

EXAMPLE 1

A solution of 0.88 gram (0.00168 mol) of cortisone in 3 ml. of dry pyridine was cooled in an ice bath and treated with 0.6 gram (.003 mol) of O-acetylsalicyloyl chloride. After 5 minutes, the mixture was diluted with water and filtered, yielding 0.71 gram of cortisone 21-acetylsalicylate, M. P. 227–230° C., a 56 percent yield. The product was recrystallized from methanol, M. P. 226–230° C. It is clear that the esterification takes place on the 21-hydroxyl group, as the 17-α-hydroxyl group is well known to be unreactive, requiring special procedures for esterification. The compound can also be designated as $\Delta^4$-pregnene-17α-21-diol-3,11,20-trione 21-(O-acetylsalicylate).

EXAMPLE 2

A solution of 2 grams (0.00632 mol) of pregnenolone in 5 ml. pyridine was mixed with 2.0 grams (0.01 mol) of O-acetylsalicyloyl chloride and the resulting solution was kept at 5° C. for 2 days. Dilution with water followed by filtration and washing with bicarbonate solution gave 3.0 grams of dried product, M. P. 160–168° C., a 99 percent yield in the form of small white needles. Two recrystallizations raised the M. P. to 174–176° C. The infrared spectrum showed carbonyl absorption at 5.71µ (acetate), 5.85µ (salicyloyl), and 5.91µ ($C_{20}$ keto group).

Analysis.—Calc'd. for $C_{30}H_{38}O_5$: C, 75.49; H, 8.00. Found: C, 75.88; H, 8.42.

$[\alpha]_D^{25}$ ($CHCl_3$) +22.3°, $m_D$=106.7, and ultraviolet absorption of $\lambda_{max}$ (ethanol) at 227.5 mµ.

The compound had significant anti-inflammatory action in the Winters' modification of the Selye inflammation test with rats, having a "$t$" at 48 hours of 3.26, and at 24 hours, of 3.55. As pregnenolone does not have significant anti-inflammatory activity, it was surprising to find that the acetylsalicylate of pregnenolone, i. e., $\Delta^5$-pregnene-3β-ol-20-one 3-(O-acetylsalicylate), does have such activity.

EXAMPLE 3

Cortisone, 0.34 gram (0.000943 mol) was dissolved in a solution of 15 ml. dry $CHCl_3$ and 2 ml. dry pyridine. Freshly distilled acetylsalicyloyl chloride (B. P. 77–79/0.4 mm. Hg), 0.2 gram (.001 mol) was added and the solution was brought to a boil on the steam bath, then was allowed to stand overnight at room temperature. Water was added, 1 ml., and the solution was allowed to evaporate at room temperature. The residue was taken up in ether-benzene solution and washed successively with dilute HCl, water, bicarbonate solution and water. The solvents were removed and the residue was recrystallized from ethanol to give 0.1 gram of cortisone acetylsalicylate. Recrystallized from ethanol, M. P. 228–230° C.

Analysis.—Calc'd. for $C_{30}H_{34}O_8$: C, 68.95; H, 6.56. Found: C, 68.71; H, 7.01.

The compound showed the following anti-inflammatory activity in the Winters' modification of the Selye inflammation test with rats having silver nitrate inflamed ankles. The dosages were 25 and 50 mg./kg. subcutaneously twice daily, while the controls were 50 mg. of cortisone acetate twice daily, one control subcutaneously and the other orally.

Table I

| Dose, mg./kg. | "t" | |
|---|---|---|
| | 24 hours | 48 hours |
| 50 | 5.475 | 5.699 |
| 25 | 4.595 | 3.223 |
| 50 (Control, SC) | 2.59 | 2.73 |
| 50 (Control, oral) | 2.42 | 3.11 |

The Winters' modification of the Selye inflammation test is a common method of determining anti-inflammatory activity. The values for "$t$" in Table I are statistical values showing differences between treated and non-treated groups of animals. It is sometimes referred to as Student's "$t$" test.

It can readily be seen that cortisone acetylsalicylate has a significant anti-inflammatory effect, being more than double that of the control.

A general review of methods of bioassay of steroid hormones, including some anti-inflammatory tests, can be found in Physiological Reviews, 34, 138–166 (1954).

EXAMPLE 4

A solution of 2.50 grams of cortisone in 10 ml. of dry pyridine was cooled to 5° C. and treated with 1.40 grams of acetylsalicyloyl chloride. After 10 minutes at 0–5° C., the solution was warmed to 25° C. for 30 minutes, then cooled and diluted with excess water. The product was filtered, washed with water and air dried to give 3.3 grams (91%) of the crude cortisone 21-acetylsalicylate, M. P. 217–223° C. Two recrystallizations from methanol yielded a sample, M. P. 219–223° C. Ultraviolet analysis showed $$\lambda_{max}^{alc.}\ 232\ m\mu$$

having an extinction coefficient of $e=26,780$ and log $e=4.43$.

*Analysis.*—Calc'd. for $C_{30}H_{34}O_8$: C, 68.95; H, 6.56. Found: C, 68.39; H, 6.61.

The compound was recrystallized from acetone, M. P. 230–231° C.

*Analysis.*—Found: C, 69.26; H, 6.46.

EXAMPLE 5

A solution of 0.50 gram (1.5 millimoles) of desoxycorticosterone in 4 ml. of dry pyridine was cooled in an ice bath and treated with 0.32 gram (1.6 millimoles) of acetylsalicyloyl chloride. After one hour at 0° C. and 15 minutes at 25° C., the solution was diluted with excess water and extracted with ether. After washing with sodium bicarbonate solution and water, the ether solution was stripped leaving a colorless, noncrystalline residue soluble in most organic solvents. The product was dissolved in methanol and precipitated by dilution with water to yield 0.65 gram of a nearly white, amorphous powder having no definite melting point, which was desoxycorticosterone 21-acetylsalicylate. Infrared analysis showed $\alpha,\beta$-unsaturated carbonyl at $6.03\mu$ and $6.21\mu$ ($\Delta^4$-3-keto); other carbonyl absorption at $5.7\mu$ (acetate) and $5.84\mu$ (C-20 carbonyl). There was no hydroxyl absorption at $2.88\mu$, such as is characteristic of the starting material. The infrared spectrum was strikingly similar to that for cortisone 21-acetylsalicylate in the carbonyl frequency region.

The desoxycorticosterone 21-acetylsalicylate structure, i. e., $\Delta^4$-pregnene-21-ol-3,20-dione 21-(O-acetylsalicylate), was further confirmed by ultraviolet analysis, $$\lambda_{max}^{alc.}\ 235\ m\mu$$

an extinction coefficient $e=24,130$, and log $e=4.38$; the ultraviolet curve was almost identical to that for cortisone 21-acetylsalicylate in Example 4.

*Analysis.*—Calc'd. for $C_{30}H_{36}O_6$: C, 73.15; H, 7.37. Found: C, 73.29; H, 7.46.

The above reaction was also carried out in pyridine-ether solution to yield the same product.

The O-acetylsalicyloyl chloride for the above procedures can be prepared by chlorinating acetylsalicylic acid with phosphorous pentachloride to give a product boiling at 90–92° C./0.4 mm. Hg.

While my new compounds in the examples above are prepared by esterification procedures, it will be realized that my compounds can also be prepared by other methods. For example, a 21-halosteroid can be reacted with a metal salt of an acylsalicylic acid.

The following table compares the activity of some of the steroid acylsalicylic acid esters of my invention to that of cortisone in reducing inflammation and edema in yeast injected rat ankles. All dosages were given by subcutaneous injection.

Table II

| Compound | Results, Cortisone = Unity |
|---|---|
| Cortisone 21-(O-acetysalicylate) | 4 |
| Desoxycorticosterone 21-(O-acetylsalicylate) | 1 |
| Pregnenolone 3-(O-acetylsalicylate) | 1 |

From the above table it is apparent that the O-acetylsalicylic acid ester group makes cortisone four times as active in the test, and gives the other compounds activity equal to that of cortisone.

The present invention provides the acylsalicylic acid esters of certain steroids as a new class of chemical compounds having valuable pharmaceutical properties. The invention also provides a convenient method of preparing these new steroid acylsalicylic acid esters.

I claim:

1. As new compounds, the 21-O-acylsalicyclic acid esters of steroids selected from the group consisting of steroids of the formula:

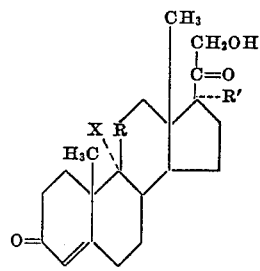

and the same containing a 1–2 double bond, in which R is selected from the group consisting of —$CH_2$, —CO and —CHOH; R' is selected from the group consisting of —H and —OH; and X is selected from the group consisting of —Cl, —F, and —H, and in which acyl is an alkyl —CO— group of 2 to 8 carbon atoms.

2. The compounds of claim 1 in which the O-acylsalicylic acid is O-acetylsalicylic acid.

3. As compounds, the 21-O-acetylsalicylates of steroids selected from the group consisting of 17-hydroxycorticosterone, 17-hydroxy-11-dehydrocorticosterone, 11-dehydrocorticosterone, corticosterone, 17-hydroxy-11-desoxycorticosterone, 11-desoxycorticosterone, and the $\Delta^1$-derivatives of the foregoing.

4. As a new compound, $\Delta^4$-pregnene-17$\alpha$,21-diol-3,11,20-trione 21-(O-acetylsalicylate).

5. As a new compound, $\Delta^5$-pregnene-3$\beta$-ol-20-one 3-(O-acetylsalicylate).

6. As a new compound, $\Delta^4$-pregnene-21-ol-3,20-dione 21-(O-acetylsalicylate).

7. The method of obtaining an acylsalicylic acid ester of a hydroxyl-containing cycloaliphatic cyclopentano-10,13-dimethylpolyhydrophenanthrene of the pregnane 20-one series which comprises esterifying said phenanthrene by treatment with a member selected from the group consisting of acylsalicyloyl chlorides, acylsalicyloyl bromides, and acylsalicylic anhydrides in which acyl represents an alkyl-CO— group of 2 to 8 carbon atoms and in which the said phenanthrene is selected from the group consisting of steroids of the formula:

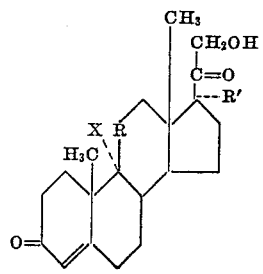

and the same containing a 1-2 double bond, in which R is selected from the group consisting of —CH$_2$, —CO and —CHOH; R' is selected from the group consisting of —H and —OH; and X is selected from the group consisting of —Cl, —F and —H.

8. The method of claim 7 in which the said phenanthrene is esterified with O-acetylsalicyloyl chloride in organic solvent in the presence of an organic amine.

9. The method of claim 7 in which said phenanthrene is esterified with O-acetylsalicyloyl chloride in pyridine solvent at a temperature between 0° C. and 25° C.

10. The method of claim 7 in which acyl represents acetyl.

11. The method of obtaining 21-acylsalicyloxy steroids in which acyl is an alkyl —CO— group of 2 to 8 carbon atoms which comprise reacting a steroid selected from the group consisting of 17-hydroxycorticosterone, 17-hydroxy-11-dehydrocorticosterone, 11-dehydrocorticosterone, corticosterone, 17-hydroxy-11-desoxycorticosterone, 11-desoxycorticosterone and the Δ$^1$-derivatives of the foregoing with a member selected from the group consisting of acylsalicyloyl chlorides, acylsalicyloyl bromides, and acylsalicylic anhydrides in which acyl has the meaning set forth above.

12. The method of preparing cortisone 21-(O-acetylsalicylate) which comprises reacting cortisone with O-acetylsalicyloyl chloride.

References Cited in the file of this patent
UNITED STATES PATENTS

| | | |
|---|---|---|
| 2,183,589 | Reichstein | Dec. 19, 1939 |
| 2,691,662 | Barsel | Oct. 12, 1954 |

OTHER REFERENCES

Fieser et al.: Natural Products Related to Phenanthrene, 3rd ed., pp. 424–26 (1949).